United States Patent
Hunt et al.

(10) Patent No.: US 10,438,583 B2
(45) Date of Patent: Oct. 8, 2019

(54) NATURAL LANGUAGE VOICE ASSISTANT

(71) Applicant: Lenovo (Singapore) Pte. Ltd., New Tech Park (SG)

(72) Inventors: James Anthony Hunt, Chapel Hill, NC (US); Russell Speight VanBlon, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/215,099

(22) Filed: Jul. 20, 2016

(65) Prior Publication Data
US 2018/0025724 A1 Jan. 25, 2018

(51) Int. Cl.
*G10L 15/22* (2006.01)
*G06F 16/9535* (2019.01)
*G06F 16/242* (2019.01)

(52) U.S. Cl.
CPC ............ *G10L 15/22* (2013.01); *G06F 16/243* (2019.01); *G06F 16/9535* (2019.01)

(58) Field of Classification Search
None
See application file for complete search history.

(56) References Cited

U.S. PATENT DOCUMENTS

| | | | | |
|---|---|---|---|---|
| 5,612,869 A * | 3/1997 | Letzt | ...... | G06Q 10/10 705/3 |
| 6,616,703 B1 * | 9/2003 | Nakagawa | ...... | G06F 17/273 704/10 |
| 7,398,061 B2 * | 7/2008 | Mousseau | ...... | H04M 1/6505 455/414.1 |
| 8,660,849 B2 * | 2/2014 | Gruber | ...... | G10L 15/22 704/275 |
| 8,719,039 B1 * | 5/2014 | Sharifi | ...... | G10L 15/08 704/275 |
| 8,768,712 B1 * | 7/2014 | Sharifi | ...... | G10L 15/08 704/275 |
| 8,913,004 B1 | 12/2014 | Bozarth et al. | | |
| 9,112,984 B2 * | 8/2015 | Sejnoha | ...... | H04M 1/72519 |
| 9,245,527 B2 * | 1/2016 | Lindahl | ...... | G10L 15/32 |
| 9,256,269 B2 * | 2/2016 | Mallinson | ...... | G06F 1/3206 |
| 9,257,120 B1 * | 2/2016 | Alvarez Guevara | ... | G10L 15/08 |
| 9,263,042 B1 * | 2/2016 | Sharifi | ...... | G10L 15/22 |
| 9,276,541 B1 | 3/2016 | Froment et al. | | |
| 9,286,892 B2 * | 3/2016 | Mengibar | ...... | G10L 15/18 |

(Continued)

FOREIGN PATENT DOCUMENTS

WO 2018063619 A1 4/2018

OTHER PUBLICATIONS

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, filed May 24, 2017.

(Continued)

*Primary Examiner* — Jonathan C Kim
(74) *Attorney, Agent, or Firm* — John L. Rogitz; John M. Rogitz

(57) ABSTRACT

A voice assistant of a device is activated not by a key word being spoken but by recognizing speech and determining whether context of the speech indicates that audible voice assistance is appropriate.

20 Claims, 5 Drawing Sheets

(56) References Cited

U.S. PATENT DOCUMENTS

| | | | |
|---|---|---|---|
| 9,318,107 B1* | 4/2016 | Sharifi | G10L 15/08 |
| 9,318,108 B2* | 4/2016 | Gruber | G10L 15/22 |
| 9,361,885 B2* | 6/2016 | Ganong, III | G10L 15/22 |
| 9,367,806 B1* | 6/2016 | Cosic | G06N 5/022 |
| 9,373,321 B2* | 6/2016 | Bapat | G10L 15/06 |
| 9,384,738 B2* | 7/2016 | Foerster | G10L 17/22 |
| 9,407,766 B1 | 8/2016 | Bradley et al. | |
| 9,418,656 B2* | 8/2016 | Foerster | G10L 15/20 |
| 9,424,841 B2* | 8/2016 | Foerster | G10L 15/02 |
| 9,542,941 B1* | 1/2017 | Weksler | G10L 15/22 |
| 9,584,946 B1* | 2/2017 | Lyren | H04S 7/30 |
| 10,068,007 B1* | 9/2018 | Wohlsen | H04L 51/02 |
| 10,121,494 B1 | 11/2018 | Sundaram et al. | |
| 2004/0044516 A1 | 3/2004 | Kennewick et al. | |
| 2004/0243547 A1* | 12/2004 | Chhatrapati | G06Q 10/06 |
| 2005/0033582 A1* | 2/2005 | Gadd | G06Q 30/02 704/277 |
| 2005/0191969 A1* | 9/2005 | Mousseau | H04M 1/6505 455/90.2 |
| 2006/0095331 A1* | 5/2006 | O'Malley | G06Q 20/20 705/22 |
| 2008/0181140 A1* | 7/2008 | Bangor | H04L 12/1818 370/261 |
| 2008/0224883 A1 | 9/2008 | Mock | |
| 2009/0006100 A1* | 1/2009 | Badger | 704/275 |
| 2009/0140855 A1* | 6/2009 | Shemesh | G06Q 10/109 340/540 |
| 2009/0232288 A1* | 9/2009 | Forbes | H04M 3/42025 379/93.23 |
| 2009/0253463 A1* | 10/2009 | Shin | H04M 1/72583 455/563 |
| 2010/0009719 A1 | 1/2010 | Oh et al. | |
| 2010/0333045 A1* | 12/2010 | Gueziec | G06F 3/016 715/863 |
| 2011/0153323 A1* | 6/2011 | Kim | G10L 15/22 704/235 |
| 2012/0034904 A1 | 2/2012 | Lebeau et al. | |
| 2012/0220271 A1* | 8/2012 | Goldfarb | H04L 63/30 455/414.1 |
| 2012/0297294 A1* | 11/2012 | Scott | G06F 17/273 715/261 |
| 2013/0005405 A1* | 1/2013 | Prociw | H04M 1/72519 455/566 |
| 2013/0080178 A1 | 3/2013 | Kang et al. | |
| 2013/0111348 A1 | 5/2013 | Gruber et al. | |
| 2013/0158984 A1 | 6/2013 | Myslinski | |
| 2013/0185078 A1* | 7/2013 | Tzirkel-Hancock | G10L 15/22 704/275 |
| 2013/0253932 A1* | 9/2013 | Ariu | G10L 15/22 704/246 |
| 2013/0275899 A1* | 10/2013 | Schubert | G06F 3/0481 715/765 |
| 2013/0339020 A1* | 12/2013 | Heo | H04N 5/44513 704/254 |
| 2013/0339028 A1* | 12/2013 | Rosner | G10L 15/222 704/275 |
| 2014/0162598 A1* | 6/2014 | Villa-Real | H04M 1/66 455/411 |
| 2014/0229184 A1* | 8/2014 | Shires | H04L 12/12 704/275 |
| 2014/0241540 A1* | 8/2014 | Hodges | H04M 1/6066 381/74 |
| 2014/0282003 A1* | 9/2014 | Gruber | G06F 3/167 715/727 |
| 2014/0379336 A1* | 12/2014 | Bhatnagar | H04R 1/1091 704/235 |
| 2014/0379341 A1 | 12/2014 | Seo et al. | |
| 2015/0032457 A1 | 1/2015 | Koo et al. | |
| 2015/0100322 A1 | 4/2015 | Lee et al. | |
| 2015/0104041 A1* | 4/2015 | Kulavik | H04R 1/1041 381/107 |
| 2015/0134334 A1* | 5/2015 | Sachidanandam | G06F 3/167 704/251 |
| 2015/0154954 A1* | 6/2015 | Sharifi | G10L 15/08 704/251 |
| 2015/0221305 A1 | 8/2015 | Sharifi | |
| 2015/0230171 A1 | 8/2015 | Sun | |
| 2015/0248885 A1* | 9/2015 | Koulomzin | G10L 15/08 704/251 |
| 2015/0253973 A1* | 9/2015 | Chiu | G06F 3/04847 715/752 |
| 2015/0254061 A1 | 9/2015 | Gelfenbeyn et al. | |
| 2015/0324753 A1* | 11/2015 | Dantuluri | G06Q 10/1095 705/7.19 |
| 2015/0347399 A1* | 12/2015 | Aue | G06F 17/289 704/2 |
| 2016/0077794 A1 | 3/2016 | Kim et al. | |
| 2016/0106174 A1* | 4/2016 | Chung | A42B 3/0453 340/539.13 |
| 2016/0118044 A1* | 4/2016 | Bondarev | G06F 16/61 704/235 |
| 2016/0154624 A1 | 6/2016 | Son et al. | |
| 2016/0165047 A1* | 6/2016 | Gray | H04M 3/436 379/201.03 |
| 2016/0217790 A1* | 7/2016 | Sharifi | G10L 15/08 |
| 2016/0381450 A1* | 12/2016 | Taite | G08B 3/10 381/74 |
| 2017/0011210 A1* | 1/2017 | Cheong | A61B 5/0022 |
| 2017/0092084 A1* | 3/2017 | Rihn | G06F 3/167 |
| 2017/0092278 A1* | 3/2017 | Evermann | G10L 17/24 |
| 2017/0124836 A1* | 5/2017 | Chung | H04W 4/90 |
| 2017/0132019 A1* | 5/2017 | Karashchuk | H04W 4/12 |
| 2017/0178001 A1 | 6/2017 | Anderson et al. | |
| 2017/0219367 A1* | 8/2017 | Liu | G06Q 50/10 |
| 2017/0279957 A1 | 9/2017 | Abramson et al. | |

OTHER PUBLICATIONS

Ming Qian, Song Wang, John Weldon Nicholson, "Activating Voice Assistant Based on at Least One of User Proximity and Context", file history of related U.S. Appl. No. 15/217,426, filed Jul. 22, 2016.

Ming Qian, Song Wang, "Systems and Methods for Activating a Voice Assistant and Providing an Indicator that the Voice Assistant Has Assistance to Give", file history of related U.S. Appl. No. 15/217,533, filed Jul. 22, 2016.

Arnold S. Weksler, John Carl Mese, Nathan J. Peterson, Russell Speight Vanblon, "Situationally Suspending Wakeup Word to Enable Voice Command Input", file history of related U.S. Appl. No. 14/872,587, filed Oct. 1, 2015.

Arnold S. Weksler, John Carl Mese, Nathan J. Peterson, Russell Speight Vanblon, "Situationally Suspending Wakeup Word to Enable Voice Command Input", related U.S. Appl. No. 14/872,587, Applicant's response to Non-Final Office Action filed Sep. 14, 2016.

Ming Qian, Song Wang, John Weldon Nicholson, "Activating Voice Assistant Based on at Least One of User Proximity and Context", related U.S. Appl. No. 15/217,426, Non-Final Office Action dated Nov. 30, 2017.

Ming Qian, Song Wang, "Systems and Methods for Activating a Voice Assistant and Providing an Indicator that the Voice Assistant has Assistance to Give", related U.S. Appl. No. 15/217,533, Final Office Action dated Feb. 9, 2018.

Ming Qian, Song Wang, John Weldon Nicholson, "Activating Voice Assistant Based on at Least One of User Proximity and Context", related U.S. Appl. No. 15/217,426, Applicant's response to Non-Final Office Action filed Dec. 26, 2017.

Ming Qian, Song Wang, "Systems and Methods for Activating a Voice Assistant and Providing an Indicator that the Voice Assistant has Assistance to Give", related U.S. Appl. No. 15/21,533, Applicant's response to Non-Final Office Action filed Dec. 12, 2017.

Ming Qian, Song Wang, "Systems and Methods for Activating a Voice Assistant and Providing an Indicator That the Voice Assistant Has Assistance to Give", related U.S. Appl. No. 15/217,533, Non-Final Office Action dated Sep. 28, 2017.

James Anthony Hunt, Russell Speight Vanblon, John Carl Mese, Nathan J. Peterson, "Natural Language Voice Assistant", related U.S. Appl. No. 15/215,099, Applicant's response to Non-Final Office Action filed Dec. 15, 2017.

(56) References Cited

OTHER PUBLICATIONS

Ming Qian, Song Wang, John Weldon Nicholson, "Activating Voice Assistant Based on at Least One of User Proximity and Context", related U.S. Appl. No. 15/217,426, Final Office Action dated May 3, 2018.

Ming Qian, Song Wang, "Systems and Methods for Activating a Voice Assistant and Providing an Indicator that the Voice Assistant Has Assistance to Give", related U.S. Appl. No. 15/217,533, Applicant's response to Final Office Action filed Apr. 23, 2018.

Ming Qian, Song Wang, "System and Methods for Activating a Voice Assistant and Providing an Indicator That The Voice Assistant Has Assistance to Give", related pending U.S. Appl. No. 15/217,533, Applicant's response to non-final office action filed Sep. 11, 2018.

Ming Qian, Song Wang, John Weldon Nicholson, "Activating Voice Assistant Based on at Least One of User Proximity and Context", related U.S. Appl. No. 15/217,426, Applicant's response to Final Office Action filed Jul. 20, 2018.

Ming Qian, Song Wang, "Systems and Methods for Activating a Voice Assistant and Providing an Indicator that the Voice Assistant has Assistance to Give", related U.S. Appl. No. 15/217,533, Non-Final Office Action dated Jun. 15, 2018.

Ming Qian, Song Wang, "Systems and Methods for Activating a Voice Assistant and Providing an Indicator that the Voice Assistant Has Assistance to Give", related U.S. Appl. No. 15/217,533, Final Office Action dated Nov. 19, 2018.

Ming Qian, Song Wang, John Weldon Nicholson, "Activating Voice Assistant Based on at Least One of User Proximity and Context", related U.S. Appl. No. 15,217,426, Non-Final Office Action dated Nov. 9, 2018.

Ming Qian, Song Wang, John Weldon Nicholson, "Activating Voice Assistant Based on at Least One of User Proximity and Context", related U.S. Appl. No. 15/217,426, Final Office Action dated Apr. 10, 2019.

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, Final Office Action dated Apr. 2, 2019.

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, Non-Final Office Action dated Nov. 26, 2018.

Russell Speight Vanblon, Arnold S. Weksler, John Carl Mese, Nathan J. Peterson, "Systems and Methods to Determine Response Cue for Digital Assistant Based on Context", related U.S. Appl. No. 15/603,892, Applicant's response to Non-Final Office Action filed Jan. 18, 2019.

Ming Qian, Song Wang, John Weldon Nicholson, "Activating Voice Assistant Based on at Least One of User Proximity and Context", related U.S. Appl. No. 15/217,426, Applicant's response to Non-Final Office Action filed Jan. 23, 2019.

* cited by examiner

Active Response

Passive Response

NATURAL LANGUAGE VOICE ASSISTANT

FIELD

The present application relates generally to systems and methods for a natural language voice assistant.

BACKGROUND

As recognized herein, existing voice assistants allow the user to create calendar entries, shopping lists, tasks, etc. But these devices only process what is spoken after receipt of a predefined wakeup word. As understood herein, it is common for users to discuss things they need to do while around the device, but there is no value the digital assistant provides to the user unless the user remembers to utter the wakeup word.

SUMMARY

Accordingly, in one aspect a device includes a processor and storage accessible to the processor. The storage bears instructions executable by the processor to receive speech and without receiving a user command to enter voice recognition mode, execute voice recognition on the speech to return plural words. The instructions are executable to, using the plural words as entering argument, access a database to correlate the plural words to ancillary information, and to return the ancillary information.

In some examples, the ancillary information may be output on at least one audio speaker. If desired, the instructions may be executable to, using the plural words as entering argument, access a grammar database, determine, using the plural words, whether the grammar database indicates at least one word is indicated, and responsive to the grammar database indicating at least one word is indicated, return the ancillary information. The ancillary information is related to the at least one word.

In some examples, the instructions can be executable to, using the plural words as entering argument, access a database, determine, using the plural words, whether the database indicates additional information is associated with the plural words, and responsive to the database indicating additional information is associated with the plural words, return the ancillary information. The ancillary information may include at least some of the additional information.

In some examples, the database includes plural phrase entries correlated with respective ancillary information. The correlation is not necessarily one-to-one, such that a first phrase entry is correlated to more than one ancillary information.

In an active return mode, return of the ancillary information may include presenting a user interface (UI) prompting to add an item from a phrase of detected natural speech to a data structure when the ancillary information is determined. In a passive return mode, return of the ancillary information may include collecting plural ancillary information over time and returning the ancillary information together, allowing a user to determine whether to use the ancillary information.

In another aspect, a computer readable storage medium that is not a transitory signal includes instructions executable by a processor to activate voice assistant at a device not by receiving a spoken key word but by recognizing speech in natural language, and to determine whether context of the speech indicates that audible voice assistance is appropriate.

In another aspect, a method includes receiving speech and without receiving a user command to enter voice recognition mode, executing voice recognition on the speech to return plural words. The method includes using the plural words as entering argument, accessing a database to correlate the plural words to ancillary information, and returning the ancillary information.

The details of present principles, both as to their structure and operation, can best be understood in reference to the accompanying drawings, in which like reference numerals refer to like parts, and in which:

DETAILED DESCRIPTION

Figure 1:
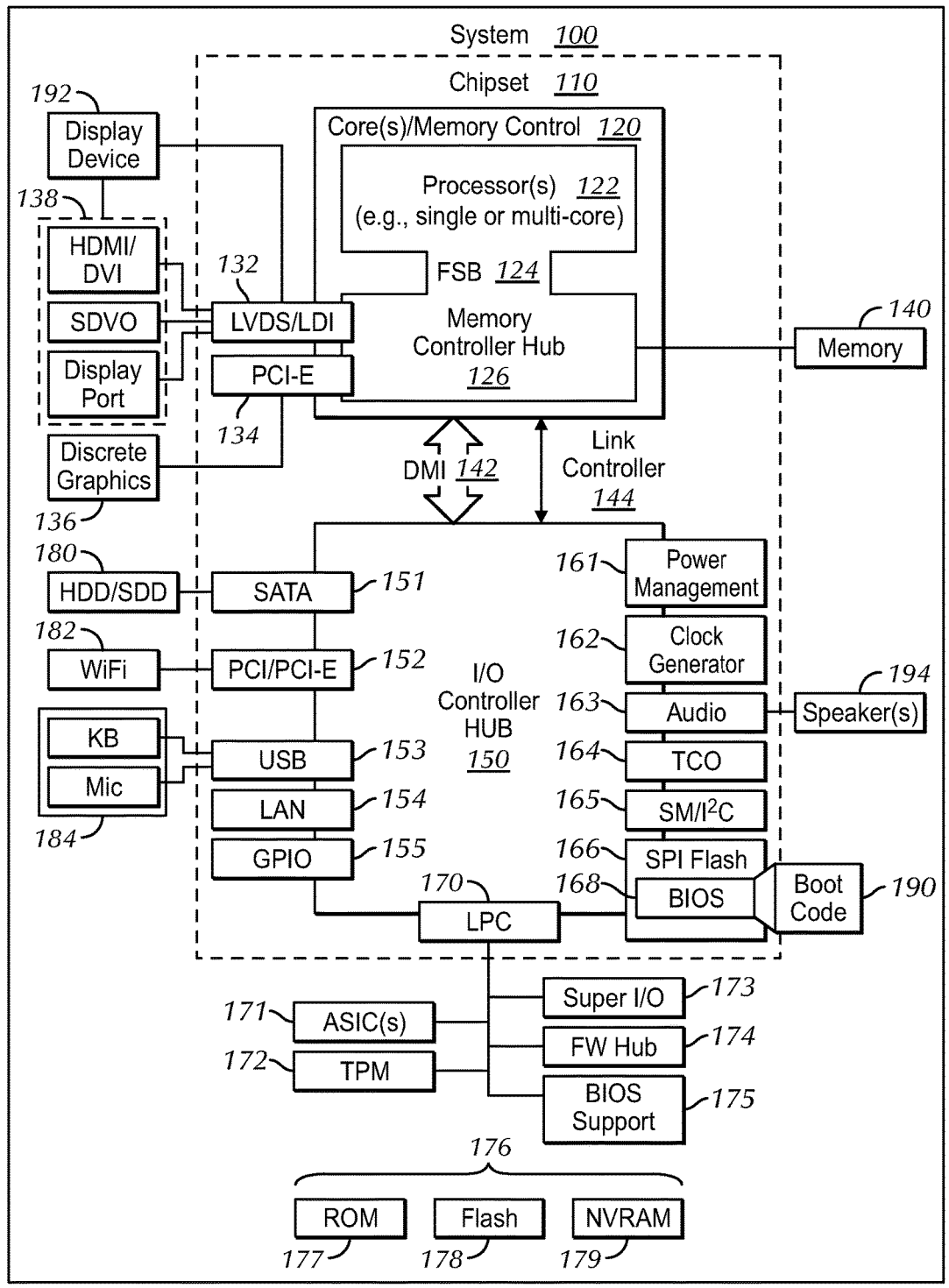
FIG. 1 is a block diagram of an example system in accordance with present principles.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB) and mice, microphones and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
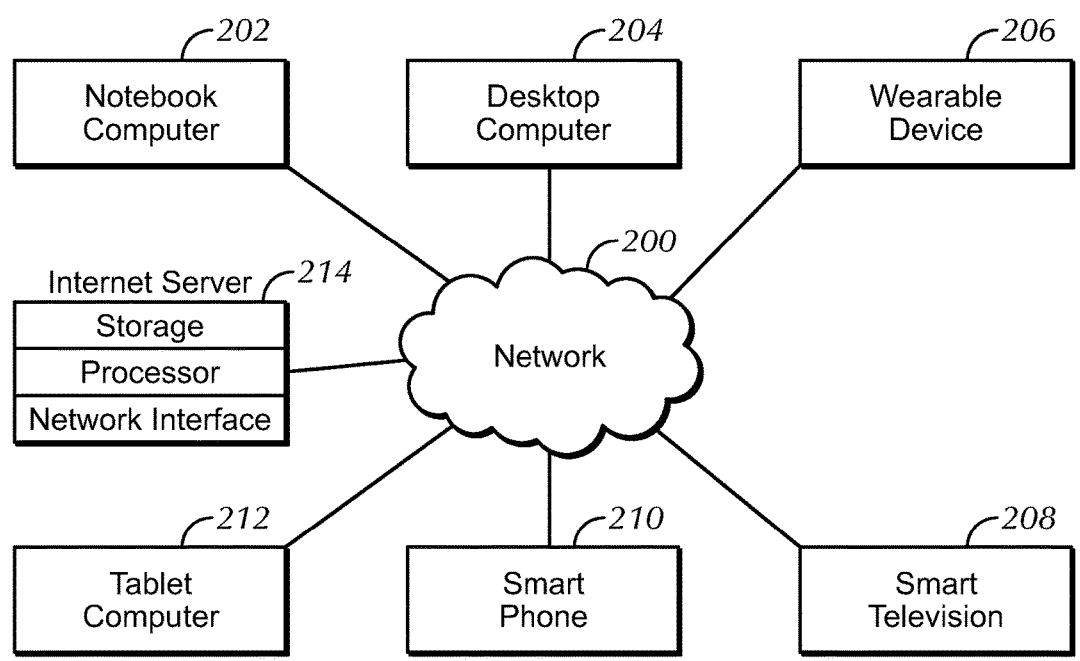
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
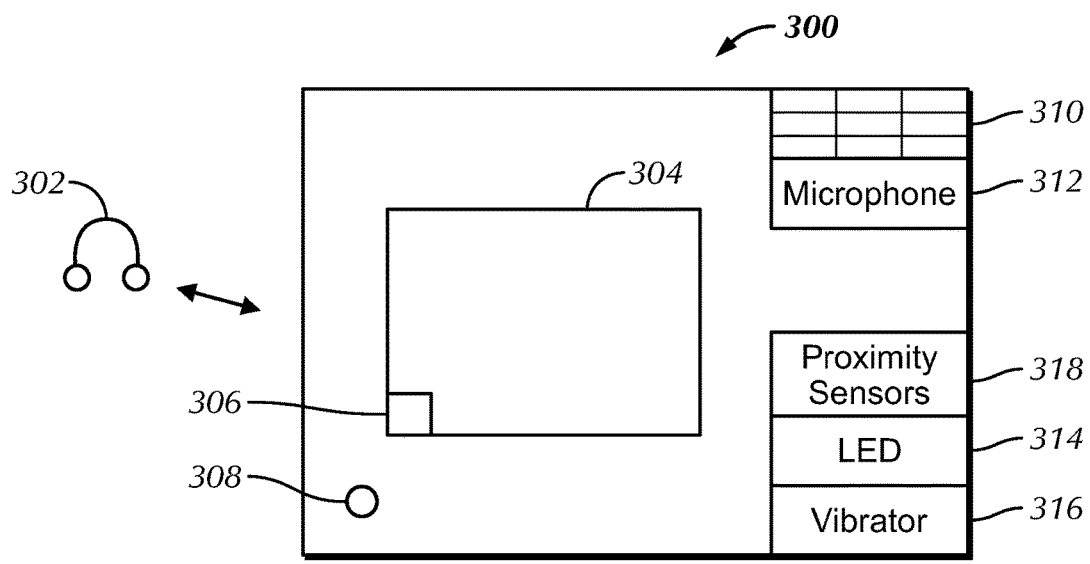
FIG. 3 is a block diagram of an example device that may be implemented by any appropriate device described in FIG. 1 or FIG. 2.

Referring to FIG. 3, a block diagram of an example computerized device 300 is shown that may be implemented by any appropriate device described above. Thus, the device 300 includes one or more of the above-described components as appropriate, including one or more processors and one or more computer storage media.

The device 300 can communicate over a wired and/or wireless link with headphones 302.

The device 300 may include a display 304 such as a touch-sensitive display that may present one or more soft selector keys 306. The device may also include one or more hard selector keys 308, one or more audio speakers 310, and one or more microphones 312. The device 300 may further include one or more indicator lamps 314 such as light emitting diodes (LEDs), one or more tactile signal generators 316 such as a vibrator, and one or more proximity sensors 318 to sense a user's proximity to the device. The proximity sensor may be implemented by an infrared detector whose signal is analyzed by the processor of the device to determine whether a human is proximate (within an IR signal strength threshold, for instance) to the device, or the sensor 318 may be a camera images from which are analyzed by the processor employing face recognition to determine whether a particular person is recognized and based on the size of the image of the face, whether the person is within a proximity threshold of the device.

Figure 4:
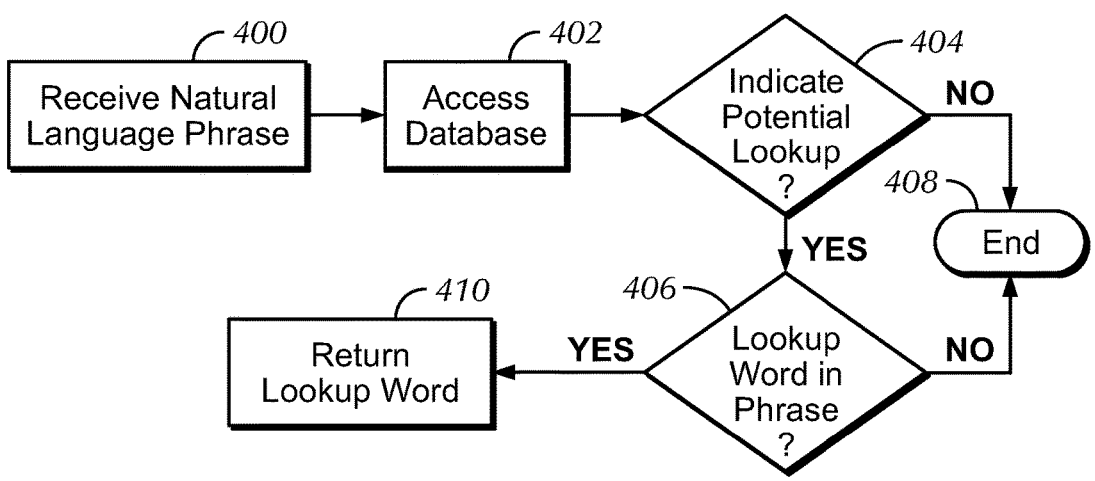
FIG. 4 is a flow chart of an example overall algorithm in accordance with present principles.

FIG. 4 illustrates overall logic. Commencing at block 400, a multi-word natural language is received. This may entail leaving the device's microphone powered up and the assistant in a monitor mode. Speech recognition is executed on the phrase to return the words for use as database entering argument or other computerized use as described below.

Moving to block 402, one or more local or cloud-based databases are accessed and the phrase from block 400 used to enter the database to determine, at diamond 404, whether the phrase is correlated with a potential term lookup. If it is, the logic may move to diamond 406 to look up the term, but a negative test at either diamond 404 or 406 can cause the process to end at state 408.

In contrast, a positive test at diamond 406 moves the logic to block 410, wherein the result of the lookup of the term is returned, e.g., for perceptible output on the computer device.

Figure 5:
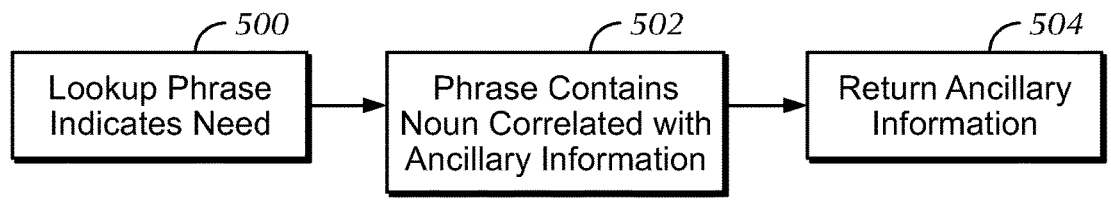
FIG. 5 is a flow chart of additional logic.

FIG. 5 illustrates. Commencing at block 500, a phrase that indicates a need is received and adjudged as such if, for example, the phrase contains the word "need" or if a grammar database indicates that the words of the phrase likely indicate a need. For example, the computer may detect a husband telling his wife "we are out of beer." Were a keyword required, the husband would have to initiate the digital assistant lookup by remembering to say "[keyword], put beer on the shopping list". However, in FIG. 5 only a single-purpose phrase (such as the one hypothesized above) is used to move the logic to block 502, in which speech recognition of the received phrase reveals that the phrase contains a noun (in this case, beer) that is correlated to ancillary information (in this case, a shopping list), which is returned at block 504 by, e.g., automatically placing "beer" on an electronic shopping list. Had the husband said "We're out of luck", the logic of digital assistant would ignore it because "luck" would not be found in the database as an item correlated with a phrase containing "need". Similarly, if the husband said "We are almost out of beer", the timing of adding the suggested item could be delayed (e.g., by a threshold time).

As another example, responsive to the device identifying ancillary information for the phrase 'we are out of milk', the voice assistant may provide an audible prompt indicating 'Would you like me to add milk to your shopping list?' The user may then audibly respond in the affirmative or negative, which may be detected by the device and used to take an appropriate action, such as adding milk to the shopping list or not doing so, respectively.

As another example, suppose a wife is detected telling her husband 'We need to clean up the basement'. This would be an example of a single-purpose phrase that is to be followed by a task or to-do item. Alternatives may include 'Remember to [task]' or 'Don't forget to [task]'.

The same principles apply to types of reminders such as calendar entries, tasks, to-do lists, lists, notes, etc. For example "I need to pick up my prescription today" would add a task to the user's configured task tracking application. As yet another example "I need to email [certain person]" may automatically generate an email draft with the email addressed to the person indicated by the user.

Multiple single-purpose phrases could be predefined by the device manufacturer, then as the user's spoken dialog is learned, the number of phrases could be refined down to what is most used in a particular household. This may result in using less processing and saving power needed for the digital assistant to process speech. Additionally or alternatively, the user may configure single-purpose phrases to their natural language preference.

Figure 6:
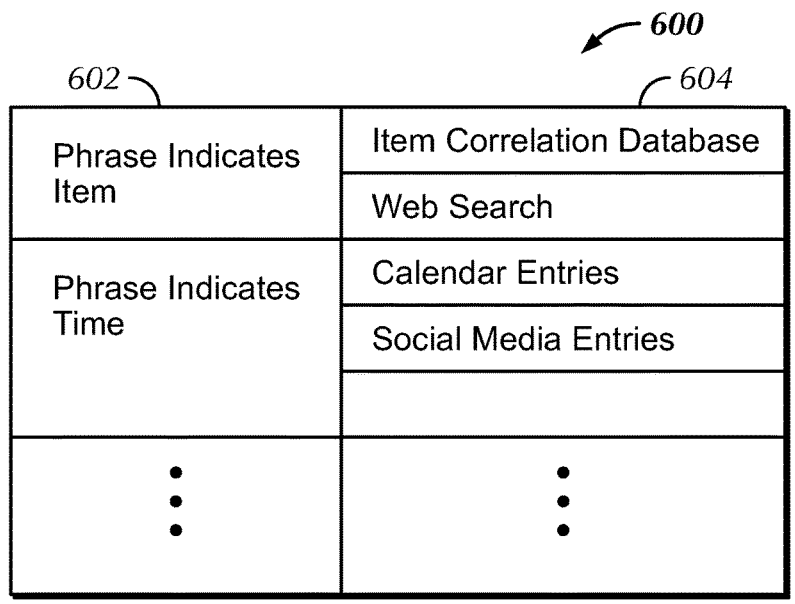
FIG. 6 is a schematic representation of a natural language phrase-to-potential lookup items data structure.

FIG. 6 illustrates an example data structure 600 appertaining to disclosure above. A series of phrase entries 602 are correlated with respective ancillary information actions 604 and as shown, the correlation need not be one-to-one, but can be one-to-many. For example, for a phrase recognized as indicating a noun naming an item of commerce, a web search may be correlated to it and returned to be conducted as the ancillary information. On the other hand, for a phase recognized as indicating a time, a calendar may be accessed to return entries connected to the time, and/or a social media site may be accessed to return entries correlated to the time, as the ancillary information.

Figure 7:
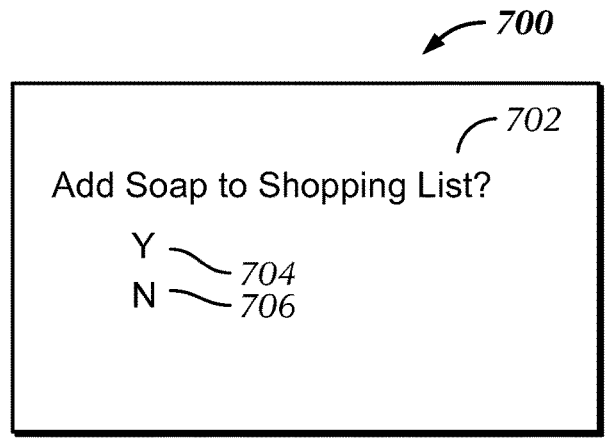
FIG. 7 is a screen shot of an example user interface (UI) illustrating principles of active response.

Return of the ancillary information may be active or passive. Referring to FIG. 7 for an example of the former, a user interface (UI) 700 may be presented on the computer device inquiring whether the user wishes to add a digital-assistant recognized item (in this case, soap) from a phrase of detected natural speech to a shopping list. The user may select at 704 to add the item and likewise can decline by selecting "no" selector 706.

In addition to or in lieu of the foregoing, return of the ancillary information in an active manner may also include providing other types of notifications and indications that ancillary information has been returned, such as a light (e.g., an LED) of the device being illuminated in a particular color associated with the return of ancillary information, and/or illumination of a light indicator on the digital assistant user interface itself that is presented on the display. This light may thus indicate that there is ancillary information that may be observed by the user so that the user can provide a command to present the ancillary information such as via the UI 700 discussed above.

Figure 8:
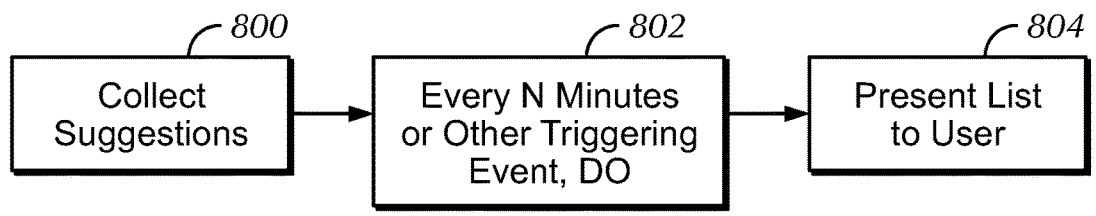
FIG. 8 is a flow chart of example logic showing passive response.
Figure 9:
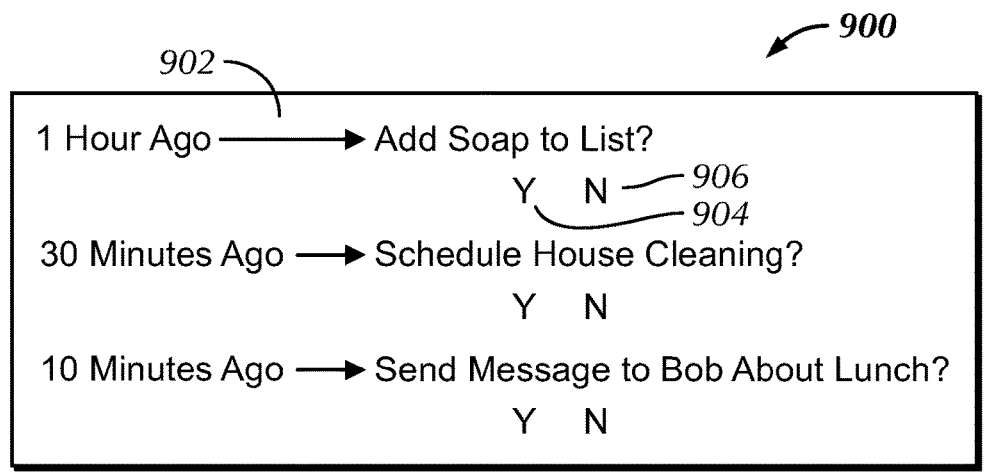
FIG. 9 is a screen shot of an example UI pertaining to FIG. 8.

FIGS. 8 and 9 illustrate the passive approach. At block 800 in FIG. 8, ancillary information in the form of suggestions (to add something to a list, etc.) according to disclosure above may be collected over a tacit period and then periodically at block 802 (e.g., every "N" minutes or upon some other triggering event such as a button push) the ancillary information such as a list can be presented to the user at block 804. The respective ancillary information may also be presented (e.g., in list form) based on a user command so that the user can observe the information at their convenience.

The UI 900 of FIG. 9 illustrates this even further. Multiple suggestions 902 collected as ancillary information from natural speech at block 800 may be presented on the display of the device, along with an indication of when the phrase from which a suggestion was derived was spoken and along with accept and decline selectors 904, 906 for each suggestion that can be selected to respectively accept and decline the respective suggestion. The passive mode gives the user an opportunity to sort through ambiguous or potentially invalid input at the time of their choosing. They could quickly allow or reject each candidate reminder to get added to their shopping list, calendar, etc.

A confidence may be associated with each candidate reminder. For example "We're out of luck" would have a low confidence since "luck" isn't a common shopping list item. The confidence can be based on how likely the follow up speech matches the preceding spoken dialog phrase. The user can be presented with a UI to adjust this confidence to increase/decrease the number of candidate reminders.

If desired, in some embodiments a list of natural language recognizer words or phrases may be used. For example, the phrases "I need to", "remember to", "don't forget to", and "we're out of" may all establish natural language phrases that may be identifiable to initiate a search for and return of ancillary information regarding language spoken after the recognizer words. Furthermore, "we're out of" may be a recognizer phrase specifically for adding items to a grocery list, for instance. Thus, in some embodiments special use-case recognizer words/phrases may be used for particular actions to be taken by the voice assistant, such as adding an item to a to-do list or generating an email draft based on particular words/phrases that are spoken.

Still further, these types of words/phrases may be customized by a user, so that a user may provide input (e.g., to a UI) specifying certain words or phrases and corresponding actions the voice assistant should take when the words/phrases are spoken. The user may even provide input for certain words/phrases to be disabled such that the voice assistant would not seek ancillary information when they are spoken.

Even further, the voice assistant may over time build a customized database for a particular user based on what the user has consistently or habitually (e.g., more than a threshold number of times) done, said, purchased, added to a list, etc. so that the voice assistant may over time become more confident regarding actions to take based on natural language from that user. What's more, if a given user never uses certain terms or is identified as speaking a particular dialect or with a particular accent (e.g., an American southern accent or a New York accent), the database may be customized based on that while other words/phrases outside of that user's dialect or accent may be omitted.

The voice assistant may choose whether to present ancillary information actively or passively in some embodiments based on the level of confidence the voice assistant has. So, for example, if the assistant has a high level of confidence then ancillary information may be returned actively, while if the assistant has a low level of confidence the ancillary information may be returned passively (e.g., to be viewed by a user at a later time of their choosing). However, note that this feature may be user-configurable (e.g., based on input to a UI) so that if desired, the user may configure the assistant to return ancillary information passively when the assistant has a high level of confidence and to return the ancillary information actively when the assistant has a low level of confidence.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one digital processor; and
   storage accessible to the at least one digital processor and comprising instructions executable by the at least one digital processor to:
   receive speech from a user;
   without receiving a user command to enter voice recognition mode, execute voice recognition on the speech to return plural words;
   using the plural words as entering argument, access at least one database to correlate the plural words to ancillary information;
   responsive to identifying that at least a first word in the plural words is correlated in the at least one database to first ancillary information and responsive to identifying a first confidence level with the first word, return the first ancillary information to the user at least in part by immediately presenting the first ancillary information without further user input; and
   responsive to identifying a second confidence level with a second word in the plural words that correlates to second ancillary information different from the first ancillary information, passively present the second ancillary information such that the second ancillary information is not immediately presented, the first confidence level being higher than the second confidence level, wherein the passive presentation of the second ancillary information comprises collecting different pieces of ancillary information over time based on different respective portions of the received speech and periodically presenting the different pieces of the ancillary information together every N minutes to allow the user to determine whether to use the different pieces of ancillary information.

2. The device of claim 1, comprising at least one audio speaker, and wherein at least some of the ancillary information is output on the at least one audio speaker.

3. The device of claim 1, wherein the instructions are executable by the at least one digital processor to:
   using the plural words as entering argument, access a grammar database;
   determine, using the plural words, whether the grammar database indicates at least one word is indicated; and
   responsive to the grammar database indicating at least one word is indicated, return the ancillary information, the ancillary information being related to the at least one word.

4. The device of claim 1, wherein the instructions are executable by the at least one digital processor to:
   using the plural words as entering argument, access the at least one database;
   determine, using the plural words, whether the at least one database indicates additional information is associated with the plural words; and
   responsive to the at least one database indicating additional information is associated with the plural words, return the ancillary information, the ancillary information comprising at least some of the additional information.

5. The device of claim 1, wherein the at least one database comprises plural phrase entries correlated with respective ancillary information, at least a first phrase entry being correlated to more than one ancillary information.

6. The device of claim 1, wherein return of the ancillary information comprises collecting respective pieces of ancillary information at different times based on different respective portions of the received speech that are received at different times and then presenting together, on a display, the different pieces of ancillary information.

7. The device of claim 6, wherein the different pieces of ancillary information are presented on the display together via a graphical user interface (GUI), the GUI comprising respective indications adjacent to the respective pieces of ancillary information that specify when the different respective portions of speech were received.

8. The device of claim 1, wherein the device customizes the at least one database over time based on one or more phrases from a particular user that are identified as spoken more than once, and wherein the at least one database is customized to include the one or more phrases identified as spoken more than once.

9. The device of claim 8, wherein the at least one database is customized to omit other phrases that have not been identified as spoken by the particular user more than once.

10. The device of claim 8, wherein the one or more phrases are single-purpose phrases.

11. The device of claim 8, wherein the one or more phrases are identified as spoken more than a threshold number of times greater than one.

12. The device of claim 8, wherein the at least one database is customized to omit other phrases in dialects outside of the particular user's dialect.

13. A computer readable storage medium (CRSM) that is not a transitory signal, the computer readable storage medium comprising instructions executable by at least one digital processor of a device to:
   receive speech from a user;
   without receiving a user command to enter voice recognition mode, execute voice recognition on the speech to return plural words;
   using the plural words as entering argument, access at least one database to correlate the plural words to ancillary information;
   responsive to identifying that at least a first word in the plural words is correlated in the at least one database to first ancillary information and responsive to identifying a first confidence level with the first word, return the first ancillary information to the user at least in part by immediately presenting the first ancillary information without further user input; and responsive to identifying a second confidence level with a second word in the plural words that correlates to second ancillary information different from the first ancillary information, passively present the second ancillary information such that the second ancillary information is not immediately presented, the first confidence level being higher than the second confidence level, wherein the passive presentation of the second ancillary information comprises collecting different pieces of ancillary information over time based on different respective portions of the received speech and periodically presenting the different pieces of the ancillary information together every N minutes to allow the user to determine whether to use the different pieces of ancillary information.

14. The CRSM of claim 13, wherein the instructions are executable by the at least one digital processor to:

using the plural words as entering argument, access a grammar database;

determine, using the plural words, whether the grammar database indicates at least one word is indicated; and responsive to the grammar database indicating at least one word is indicated, return the ancillary information, the ancillary information being related to the at least one word.

15. The CRSM of claim 13, wherein the at least one database comprises at least a first phrase entry correlated to more than one ancillary information.

16. A computer-implemented method, comprising:

receiving speech from a user;

executing, without receiving a user command to enter voice recognition mode, voice recognition on the speech to return plural words;

accessing, using the plural words as entering argument, at least one database to correlate the plural words to ancillary information;

responsive to identifying that at least a first word in the plural words is correlated in the at least one database to first ancillary information and responsive to identifying a first confidence level with the first word, returning the first ancillary information to the user at least in part by immediately presenting the first ancillary information without further user input; and responsive to identifying a second confidence level with a second word in the plural words that correlates to second ancillary information different from the first ancillary information, passively presenting the second ancillary information such that the second ancillary information is not immediately presented, the first confidence level being higher than the second confidence level, wherein the passively presenting the second ancillary information comprises collecting different pieces of ancillary information over time based on different respective portions of the received speech and periodically presenting the different pieces of the ancillary information together every N minutes to allow the user to determine whether to use the different pieces of ancillary information.

17. The computer-implemented method of claim 16, wherein the at least one database comprises at least a first phrase entry correlated to more than one ancillary information.

18. The computer-implemented method of claim 16, comprising:

periodically presenting the different pieces of ancillary information together at least in part by presenting the different pieces of ancillary information together via a user interface (UI) that is presented on a display.

19. The computer-implemented method of claim 16, wherein returning of the ancillary information comprises collecting respective pieces of ancillary information at different times based on different respective portions of the received speech that are received at different times and then presenting, on a display together, the different pieces of ancillary information.

20. The computer-implemented method of claim 19, wherein the different pieces of ancillary information are presented on the display together via a graphical user interface (GUI), the GUI comprising respective indications adjacent to the respective pieces of ancillary information that specify when the different respective portions of speech were received.

* * * * *